Patented Apr. 7, 1953

2,633,954

UNITED STATES PATENT OFFICE 2,633,954

SYNCHRONIZING CLUTCH

Ernest C. Allen, Wauwatosa, Wis., assignor to Allis-Chalmers Manufacturing Company, Milwaukee, Wis., a corporation of Delaware Application November 3, 1949, Serial No. 125,318

11 Claims. (Cl. 192—53)

This invention relates to automatic couplings for rotary units and more particularly to synchronizing positive clutches. A principal object of the invention is the provision of new and improved apparatus of this type.

To establish a positive torque transmitting connection between a pair of rotating elements without clashing of clutch teeth, it is requisite that the elements which are to be interconnected be brought to the same rotational speed and complementary parts thereof aligned before meshing of the clutch teeth. It has been proposed to substantially synchronize the rotary elements by various means such as friction clutches and effect positive synchronism and alignment of complementary parts through the engagement of tapered guide teeth slidably mounted on a main clutch member and biased toward clutched position so that engagement thereof precedes engagement of main clutch teeth. Such devices, however, are open to the objection that tangential forces applied to the guide teeth prior to complete engagement tend to move the teeth against their bias toward the unclutched position. It is therefore an object of this invention to provide an improved clutch structure which will effect synchronism and alignment of complementary parts through interengaging guide teeth and which will not be subject to the aforementioned objection. This invention contemplates the provision of positive actuating means for moving the guide teeth relative to the main clutch member.

Another object of this invention is to provide a positive synchronizing clutch having an improved synchronizing mechanism which is efficient, simple and effective.

Another object of this invention is to provide a fluid pressure operable positive synchronizing clutch in which movement of the synchronizing mechanism toward the clutched position precedes movement of the main clutch member in a definite relation. This invention contemplates initial throttling of the supply of fluid under pressure to the main clutch member actuating means to effect the desired sequence of movements.

Other objects will appear hereinafter as the description of the invention proceeds.

The novel features of the invention and how the objects are attained will appear more fully from this specification and the accompanying drawing showing one embodiment of the invention and forming a part of this application, and all the novel features are intended to be pointed out in the claims.

Figure 1:
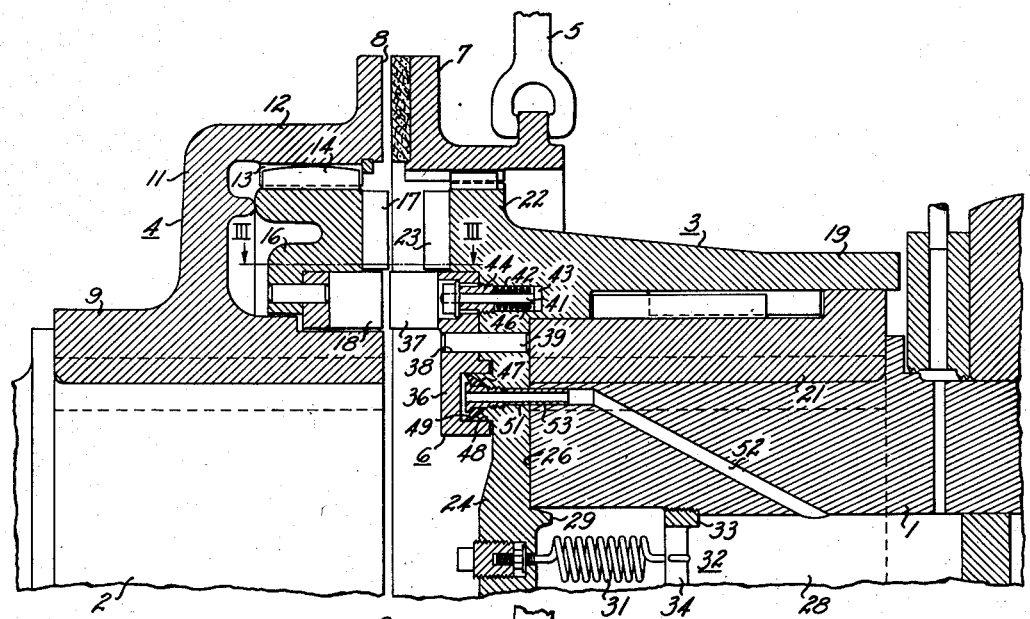
Fig. 1 is a fragmentary longitudinal section of a clutch embodying this invention with the parts thereof in the unclutched position.

Referring to the drawing, the clutch herein illustrated as embodying this invention is shown as arranged to connect a pair of axially aligned rotary shafts in torque transmitting relation. For convenience in describing the structure, the right hand shaft 1 and its associated clutch parts will be referred to as driving members and the left hand shaft 2 and its associated clutch parts will be referred to as driven members. However, it will be understood that either shaft may be the driver. The clutch comprises a positive driving clutch member 3 mounted on the driving shaft 1 to rotate therewith and shiftable axially thereof into and out of engagement with a driven clutch member 4 rigidly carried by the driven shaft. A positive synchronizing mechanism 6 is slidably carried by the driving clutch member 3 and is movable relative thereto by fluid pressure operable actuating means to engage the driven clutch member 4. Movement of the synchronizing mechanism 6 toward engaged position will precede movement of the driving clutch member 3 as will more fully appear. Slidably mounted on the outer periphery of the driving clutch member to rotate therewith is an annular friction element 7 shiftable by means of a lever 5 into and out of engagement with a friction surface 8 formed on the driven clutch member 4. The friction element 7 and surface 8 comprise a synchronizing friction clutch, other forms of which will suggest themselves to those skilled in the art.

The driven clutch member 4 is here shown as comprising a hub 9 keyed to the driven shaft 2 and provided with a radially extending flange 11 which carries an axially extending flange or rim 12 on its periphery. The rim 12 extends toward the driving clutch member 3 and is provided on its inner periphery with splines 13 which engage complementary splines 14 formed on the outer periphery of an annular element 16. The outer periphery of the splines 14 may have a spherical configuration to provide for flexibility in case of want of alignment between the driving and the driven members. Formed on a face of the annular element 16 is an annular row of main driven clutch teeth 17 which are disposed on radii of the element 16 and extend toward the driving member 3. The teeth 17 may be of any known shape and are here shown as truncated wedges. An annular row of guide teeth 18 is secured to the element 16 adjacent the inner periphery of the row of driven clutch teeth 17. The guide teeth may be of any suitable shape (shown in Fig. 3 as tapered with rounded extremities) and are here shown as rigidly doweled to the annular element 16.

The driving clutch member 3 comprises a hub 19 slidably splined on a sleeve 21 which is rigidly keyed to the driving shaft 1. A radially extending flange 22 formed on the hub 19 is provided with an annular row of main driving clutch teeth 23 which extend toward and are complementary to the main driven clutch teeth 17. A disk 24, formed integral with the hub 19, is disposed adjacent the end of the driving shaft 2, abutting the end 26 of the shaft 1 when the clutch member 3 is in the unclutched position.

The hub 19, disk 24 and end 26 of the driving shaft 1 define a cylindrical pressure chamber 27 the expansion of which by admission of fluid under pressure thereto will move the driving clutch member 3 toward the driven clutch member 4 and effect engagement of the driving teeth 23 with the driven teeth 17. Fluid under pressure may be admitted to the chamber 27 through a bore 28 formed in the center portion of the shaft 1 and communicating with a source of fluid under pressure (not shown) and with the chamber 27. Admission of fluid under pressure to the chamber 27 may be prevented or restricted by means of an annular boss 29 formed on the disk 24 and disposed in axial alignment with the outlet of the bore 28. The outer periphery of the boss 29 defines the side surface of a frustum of a cone, the base diameter of which is equal to the diameter of the bore 28. It will be apparent that the boss 29 will prevent admission of fluid to the space between the disk 24 and the end 26 of the driving shaft 1 when the clutch is in the unclutched position as shown in Fig. 1 and that movement of the driving clutch member 3 toward clutched position will permit a throttled flow of fluid under pressure to the chamber 27, the throttling effect varying inversely as the distance moved until the boss is free of the bore 28 at which time flow of fluid under pressure to the chamber will be unrestricted. The clutch member 3 is biased toward the unclutched position by a spring 31, one end of which is secured to the disk 24 and the other end of which is secured to a suitable fitting 32 threaded into the bore 28. The fitting 32 may comprise an annulus 33 with a spring receiving cross member 34 affixed thereto, sufficient space being provided between the annulus and the cross member to permit free flow of fluid under pressure past the fitting.

The positive synchronizing mechanism 6 comprises a generally annular element 36 disposed adjacent the inner periphery of the row of driving clutch teeth 23 and provided with an annular row of guide teeth 37 which extend toward and are complementary to the guide teeth 18. The element 36 is provided with an annular row of holes 38 (only one of which is shown) which slidingly receive axially extending dowels 39 rigidly secured at one end to the disk 24. The dowels 39 permit axial movement of the guide tooth carrying element 36 relative to the driving clutch member 3 while maintaining a torque transmitting relation therebetween. A plurality of rods 41 (only one of which is shown) engage at one end with the element 36 and each extends axially into a cylindrical recess 42 formed in the hub 19. A circular nut 43 is attached to the end of each rod 41 extending into the recess 42 and a bushing 44 encompassing each rod is threaded into the open end of each recess 42. A spring 46 engages the bottom of each bushing 44 and circular nut 43 to bias the guide tooth carrying element 36 toward disengaged position.

The guide tooth carrying element 36 is movable relative to the driving clutch member 3 and against the bias of the springs 46 by fluid pressure operable actuating means which may comprise an annular piston 47 formed on the disk 24 and slidably engaging the walls of an annular cylinder 48 formed in the guide tooth carrying element 36. Secured to the end of the piston 47 is a flexible annular sealing element 49 of concave-convex cross section the edges of which will be forced against the walls of the cylinder 48 in pressure sealing relation when fluid under pressure is admitted to the cylinder. Fluid under pressure is supplied to the synchronizing mechanism actuating means by supply means comprising a passage 51 formed in the clutch member 3, extending through the disk 24 and the piston 47, and communicating with the annular cylinder 48 and with the chamber 27. A passage 52 formed in the driving shaft 1 communicates with the bore 28 and the chamber 27 and is so disposed that the outlet thereof will register with the outlet of the passage 51. The outlet of the passage 52 is disposed on a larger radius than is the bore 28 so that centrifugal force will cause the fluid pressure at the outlet of the passage 52 to exceed the fluid pressure at the outlet of the bore 28. A length of tubing 53 is fixed in the outlet of the passage 52 and extends axially toward the disk 24 so that the tubing will engage the walls of the passage 51 to establish direct communication between the passage 51 and the passage 52 when the clutch member is in the unclutched position and movement of the clutch member toward clutched position will interrupt communication between the tubing 53 and the passage 51 and will establish communication between the passage 51 and the chamber 27.

Figure 2:
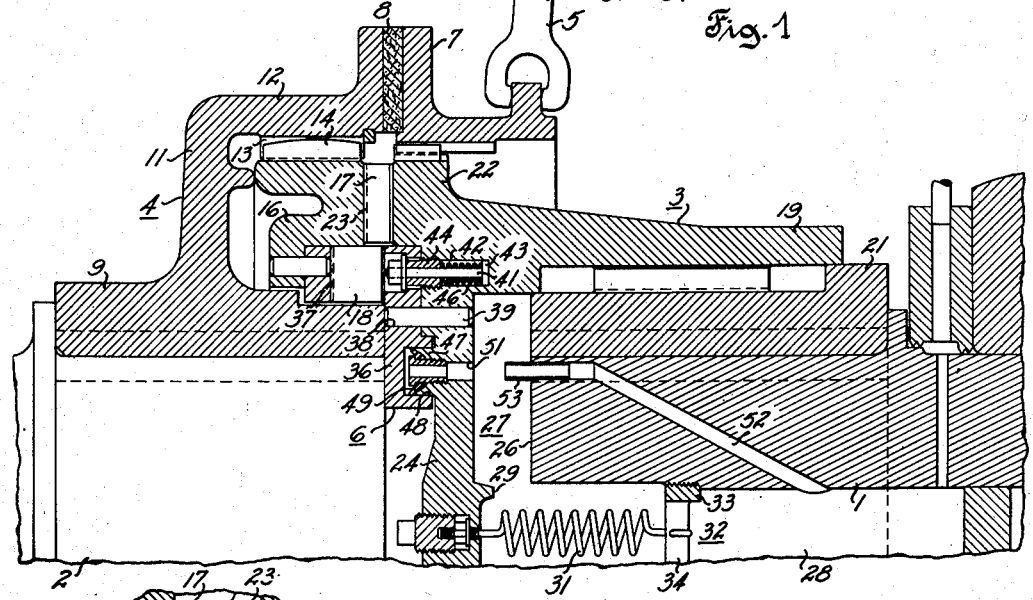
Fig. 2 is a fragmentary longitudinal section of the clutch shown in Fig. 1 with the parts thereof in clutched position.
Figure 3:
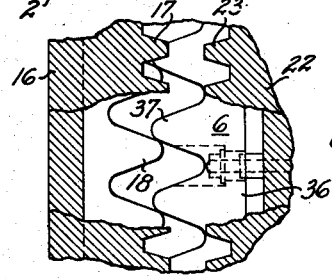
Fig. 3 is a fragmentary development taken on the line III—III of Fig. 1 with a portion broken away to show the clutch parts in a position intermediate the clutched and unclutched positions.

Operation of the herein illustrated clutch is as follows:

Assume that the clutch is in the unclutched position as shown in Fig. 1, that the shafts are rotating at approximately equal speeds and it is desired to engage the clutch. The friction element 7 is shifted axially into engagement with the friction surface 8 to effect substantial synchronism between the driving and the driven members. Fluid under pressure is then admitted to the bore 28 and passes into the annular cylinder 48 through the passage 51, the tubing 53 and the passage 52 to effect the movement of the element 36 against the bias of the springs 46 toward the driven member 4 and the engagement of the guide teeth 37 with the guide teeth 18. Fig. 3 shows the guide teeth 18, 37 partially engaged and it will be apparent that the tapered form thereof will permit incipient engagement regardless of the relative angular positions of the driving and driven member and that complete engagement will result in alignment of complementary parts and positive synchronism of the shafts 1, 2. As the synchronizing mechanism 6 moves toward the engaged position, the springs 46 are compressed until the combination of the force exerted thereby on the driving clutch member 3 and the force exerted on the disk 24 by the fluid under pressure in the bore 28 becomes sufficiently large to move the clutch member 3 toward clutched position. Such movement of the clutch member moves the annular boss 29 to the left to permit a throttled flow of fluid from the bore 28 to the pressure chamber 27. As the fluid pressure in the pressure chamber 27 builds up, further movement of the clutch member 3 toward the clutched position is effected, such movement decreasing the throttling effect of the boss 29 (as hereinbefore pointed out) which in turn accelerates movement of the clutch member 3. Still further movement of the clutch member 3 to the left causes the tubing 53 to be disengaged from the walls of the passage 51 and direct communication between the cylinder 48 and the passage 52 is thereby interrupted. This permits the fluid in the cylinder 48 to flow into the chamber 27 and enables the clutch member 3 to assume the clutched position as shown in Fig. 2.

It will be apparent that the admission of a substantial quantity of fluid under pressure to the pressure chamber 27 is dependent upon movement of the synchronizing mechanism 6 to the engaged position and that movement of the clutch element 3 toward engaged position must therefore lag such movement of the synchronizing mechanism. It is also to be noted that centrifugal forces acting on the fluid in the passage 52 will cause the pressure in the cylinder 48 to exceed that in the bore 28 to further insure movement of the synchronizing mechanism preceding movement of the clutch member 3. Such a sequence of movements will result in positive synchronism being attained before meshing of the main clutch teeth.

It will be apparent to those skilled in the art that the mechanism herein described provides a new and improved positive synchronizing clutch and accordingly accomplishes the objects of the invention. It will also be obvious to those skilled in the art that the illustrated embodiment may be variously changed and modified, or features thereof, singly or collectively embodied in other combinations than those illustrated without departing from the spirit of the invention or sacrificing all of the advantages thereof, and that accordingly the disclosure herein is illustrative only and the invention is not limited thereto.

It is claimed and desired to secure by Letters Patent:

1. In a clutch structure for transmitting rotary motion, the combination comprising: a first rotatable member; a second rotatable member; a positive clutch member slidably mounted on said first rotatable member to rotate therewith, said clutch member being axially movable to engage said second rotatable member and connect said first and said second rotatable members in torque transmitting relation; synchronizing mechanism, including a plurality of guide teeth, slidably carried by said clutch member and engageable with said second rotatable member; first fluid pressure operable actuating means for moving said synchronizing mechanism axially relative to said clutch member; second fluid pressure operable actuating means for moving said clutch member axially relative to said first rotatable member; fluid pressure supply means for supplying fluid under pressure to said first and said second actuating means; fluid pressure supply control means for said second actuating means having a first position in which fluid under pressure to said second actuating means is prevented and a second position in which flow of fluid under pressure to said second actuating means acts to move said clutch member to the engaged position; and connection means between said fluid pressure supply control means and said clutch member and said synchronizing mechanism for causing said control means to move toward said second position in response to a predetermined movement of said synchronizing mechanism toward engaged position.

2. In a clutch structure for transmitting rotary motion, the combination comprising: a first rotatable member; a second rotatable member substantially coaxial with said first rotatable member; a positive clutch member slidably mounted on said first rotatable member to rotate therewith, said clutch member being axially movable to connect said first and said second rotatable members in torque transmitting relation and including a hub slidably mounted on said first rotatable member and a piston element carried by said hub, said piston element comprising a disk disposed perpendicular the axis of and adjacent one end of said first rotatable member; a first passage in said first rotatable member communicating with a source of fluid under pressure and with the space between said piston element and said one end of said first rotatable member; sealing means carried by said piston element for restricting said first passage when said clutch member is in the unclutched position; a synchronizing guide tooth carrying member slidably carried by said clutch member; fluid pressure actuating means interposed between said guide tooth carrying member and said clutch member for moving said guide tooth carrying member axially relative to said clutch member; a second passage formed in said first rotatable member and communicating with a source of fluid under pressure; a third passage formed in said clutch member and communicating with said fluid pressure actuating means; and means interposed between said second passage and said third passage to establish communication therebetween when said clutch member is in the unclutched position and to interrupt communication therebetween when said clutch member moves toward the clutched position.

3. In a clutch structure for transmitting rotary motion, the combination comprising: a first rotatable member; a second rotatable member substantially coaxial with said first rotatable member; a positive clutch member slidably mounted on said first rotatable member to rotate therewith, said clutch member being axially movable to connect said first and said second rotatable members in torque transmitting relation and including a hub slidably mounted on said first rotatable member and a piston element carried by said hub, said piston element comprising a disk disposed perpendicular the axis of and adjacent one end of said first rotatable member; a first passage in said first rotatable member communicating with a source of fluid under pressure and the space between said piston element and said one end of said first rotatable member; sealing means carried by said piston element for restricting said first passage when said clutch member is in the unclutched position; a synchronizing guide tooth carrying member slidably carried by said clutch member; fluid pressure actuating means interposed between said guide tooth carrying member and said clutch member for moving said guide tooth member axially relative to said clutch member; a second passage formed in said first rotatable member and communicating with a source of fluid under pressure; a third passage formed in said clutch member and communicating with said fluid pressure actuating means; and means cooperating with said clutch member for establishing communication between said second passage and said third passage when said clutch member is in the unclutched position and for establishing communication between said second passage and said space between said piston element and said one end of said first rotary member when said clutch member moves toward the clutched position.

4. In a clutch structure for transmitting rotary motion, the combination comprising: a first rotatable member; a second rotatable member; a positive clutch member slidably mounted on said first rotatable member to rotate therewith, said clutch member being axially movable to engage said second rotatable member to connect said first and said second rotatable members in torque transmitting relation; a synchronizing mechanism carried by said clutch member and axially slidable relative thereto, said synchronizing mechanism including a plurality of guide teeth engageable with said second rotatable member; first means for imparting initial axial movement to said synchronizing mechanism relative to said clutch member to cause said guide teeth to engage said second rotatable member, and second means including said synchronizing mechanism for imparting axial movement to said clutch member relative to said first rotatable member subsequent to said engagement of said guide teeth with said second rotatable member to cause engagement of said first and second rotatable members.

5. In a clutch structure for transmitting rotary motion, the combination comprising: a first rotatable member; a second rotatable member; a positive clutch member slidably mounted on said first rotatable member to rotate therewith, said clutch member being axially movable to engage said second rotatable member to connect said first and said second rotatable members in torque transmitting relation; a synchronizing mechanism carried by said clutch member and axially slidable relative thereto, said synchronizing mechanism including a plurality of guide teeth engageable with said second rotatable member; first means for imparting initial axial movement to said synchronizing mechanism relative to said clutch member from a first position in which said guide teeth are disengaged from said second rotatable member to a second position in which said guide teeth are fully engaged with said second rotatable member, and a second means responsive to a predetermined axial movement of said synchronizing mechanism between said two positions for subsequently causing said clutch member to move axially relative to said first rotatable member for engagement with said second rotatable member.

6. In a clutch structure for transmitting rotary motion, the combination comprising: a first rotatable member, a second rotatable member; a positive clutch member slidably mounted on said first rotatable member to rotate therewith; said clutch member being axially movable to engage said second rotatable member and connect said first and said second rotatable members in torque transmitting relation; synchronizing mechanism carried by said clutch member and axially slidable relative thereto, said synchronizing mechanism including a plurality of guide teeth, engageable with said second rotatable member; first fluid pressure actuating means for moving said synchronizing mechanism axially relative to said clutch member; second fluid pressure actuating means for moving said clutch member axially relative to said first rotatable member; and control means for controlling the admission of fluid under pressure to said first and said second actuating means, said control means being operative to admit fluid under pressure to said first actuating means for causing initial movement of said synchronizing mechanism relative to said clutch member and toward said second rotatable member before admitting said fluid under pressure to said second actuating means to cause subsequent movement of said clutch member relative to said first rotatable member toward said second rotatable member.

7. In a clutch structure for transmitting rotary motion, the combination comprising: a first rotatable member; a second rotatable member; a positive clutch member slidably mounted on said first rotatable member to rotate therewith, said clutch member being axially movable to engage said second rotatable member and connect said first and said second rotatable members in torque transmitting relation; synchronizing mechanism carried by said clutch member and axially slidable relative thereto, said synchronizing member including a plurality of guide teeth engageable with said second rotatable member; first fluid pressure actuating means for moving said synchronizing mechanism axially relative to said clutch member; second fluid pressure actuating means for moving said clutch member axially relative to said first rotatable member; fluid pressure supply means for supplying fluid under pressure to said first and said second actuating means; and means for throttling the supply of fluid under pressure to said second actuating means for causing movement of said clutch member relative to said first rotatable member and toward said second rotatable member after said first actuating means has caused initial movement of said synchronizing mechanism relative to said clutch member toward said second rotatable member.

8. In a clutch structure for transmitting rotary motion, the combination comprising: a first rotatable member; a second rotatable member; a positive clutch member slidably mounted on said first rotatable member to rotate therewith, said clutch member being axially movable to engage said second rotatable member and connect said first and said second rotatable members to torque transmitting relation; synchronizing mechanism carried by said clutch member and axially slidable relative thereto, said synchronizing mechanism including a plurality of guide teeth engageable with said second rotatable member; first fluid pressure actuating means for moving said synchronizing mechanism axially relative to said clutch member; second fluid pressure actuating means for moving said clutch member axially relative to said first rotatable member; fluid pressure supply means for supplying fluid under pressure to said first and said second actuating means; control means for said second actuating means having a first position in which fluid under pressure is denied admission to said second actuating means, and a second position in which fluid under pressure is permitted to flow freely to said second actuating means; including connection means between said control means and said clutch member for causing said control means to move from said first position toward said second position in response to movement of said clutch member toward said second rotatable member.

9. In a clutch structure for transmitting rotary motion, the combination comprising: a first rotatable member, a second rotatable member; a positive clutch member slidably mounted on said first rotatable member to rotate therewith, said clutch member being axially movable to engage said second rotatable member and connect said first and said second rotatable members in torque transmitting relation; synchronizing mechanism carried by said clutch member and axially slidable relative thereto, said synchronizing mechanism including a plurality of guide teeth engageable with said second rotatable member; first fluid pressure actuating means for moving said synchronizing mechanism axially relative to said clutch member; second fluid pressure actuating means for moving said clutch member axially relative to said first rotatable member; a first fluid supply means disposed about said first rotatable member for supplying fluid under pressure to a first actuating means; a second fluid supply means disposed about said first rotatable member for supplying fluid to a second actuating means; said first fluid supply means being positioned a greater distance from the axis of rotation of said first rotatable member than said second supply means to cause said first fluid supply means to exert a greater fluid pressure on said synchronizing mechanism upon rotation of said first rotatable member than said second fluid supply means exerts on said clutch member for effecting movement of said synchronizing mechanism toward said second rotatable member before movement of said clutch member toward said second rotatable member is effected by said second fluid supply means.

10. In a clutch structure for transmitting rotary motion, the combination comprising: a first rotatable member, a second rotatable member; a positive clutch member slidably mounted on said first rotatable member to rotate therewith, said clutch member being axially movable to engage said second rotatable member and connect said first and said second rotatable members in torque transmitting relation; synchronizing mechanism carried by said clutch member and axially slidable relative thereto, said synchronizing mechanism including a plurality of guide teeth engageable with said second rotatable member; first fluid pressure actuating means for moving said synchronizing mechanism axially relative to said clutch member; second fluid pressure actuating means for moving said clutch member axially relative to said first rotatable member; first fluid supply means disposed about said first rotatable member for supplying fluid under pressure to said first actuating means; a second fluid supply means disposed about said first rotatable member for supplying fluid to said second actuating means; said first fluid supply means being positioned a greater distance from the axis of rotation of said first rotatable member than said second supply means to cause said first fluid supply means to exert a greater fluid pressure on said synchronizing mechanism upon rotation of said first rotatable member than said second fluid supply means exerts on said clutch member for effecting movement of said synchronizing mechanism toward said second rotatable member before movement of said clutch member toward said second rotatable member is effected by said second actuating means; fluid pressure supply control means for said second actuating means having a first position in which fluid under pressure is denied admission to said second actuating means, and a second position in which fluid under pressure is permitted to flow freely to said second actuating means; including connection means between said fluid pressure supply control means and said clutch member for causing said control means to move from said first position toward said second position in response to movement of said clutch member toward said second rotatable member.

11. In a clutch structure for transmitting rotary motion, the combination comprising: a first rotatable member; a second rotatable member; a positive clutch member slidably mounted on said first rotatable member to rotate therewith, said clutch member being axially movable to engage said second rotatable member to connect said first and said second rotatable members in torque transmitting relation; a synchronizing mechanism carried by said clutch member and axially slidable relative thereto, said synchronizing mechanism including a plurality of guide teeth engageable with said second rotatable member; first means for imparting initial axial movement to said synchronizing mechanism relative to said clutch member to cause said guide teeth to engage said second rotatable member, and second means for imparting axial movement to said clutch member relative to said first rotatable member subsequent to said engagement of said guide teeth with said second rotatable member to cause engagement of said first and second rotatable members.

ERNEST C. ALLEN.

REFERENCES CITED

The following references are of record in the file of this patent:

UNITED STATES PATENTS

| Number | Name | Date |
|---|---|---|
| 2,438,157 | Dugas | Mar. 23, 1948 |

FOREIGN PATENTS

| Number | Country | Date |
|---|---|---|
| 525,615 | Great Britain | Sept. 2, 1940 |
| 647,456 | Germany | July 5, 1937 |